May 17, 1966  C. R. GORDON  3,251,762
ELECTRODE FOR ELECTROLYTIC METAL SHAPING
Filed Aug. 24, 1961  11 Sheets-Sheet 2
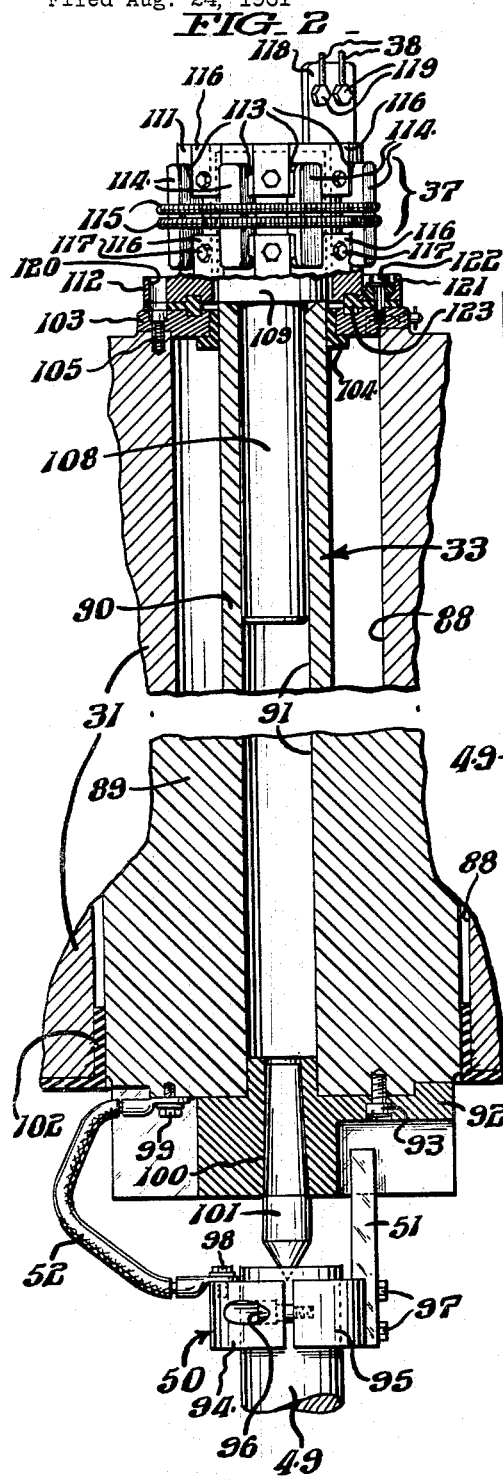
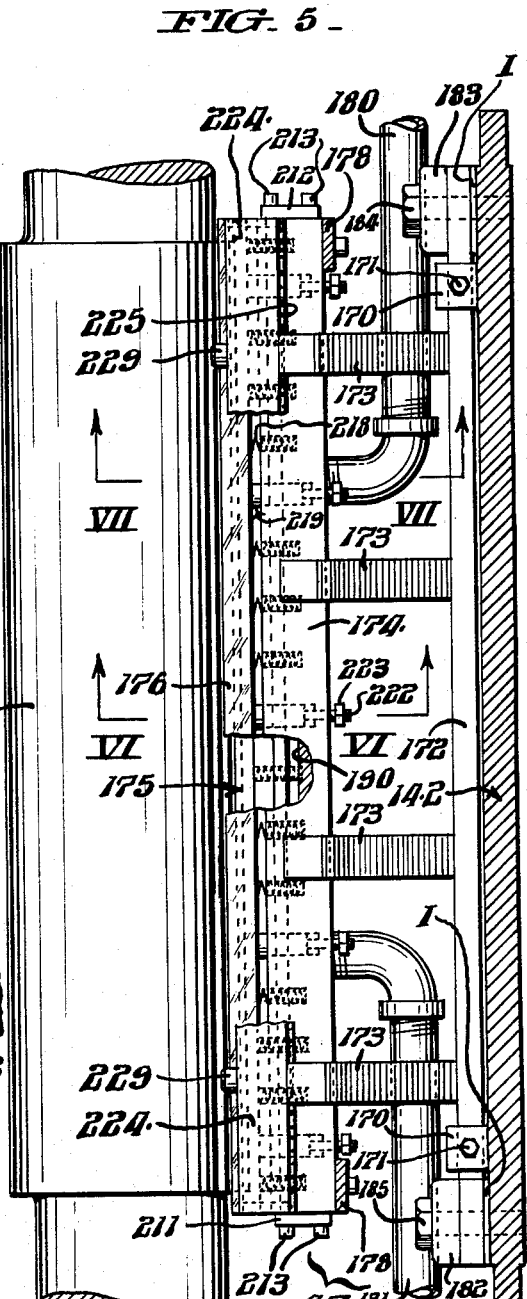
INVENTOR.
Charles R. Gordon,
BY
Paul & Paul
ATTORNEYS.

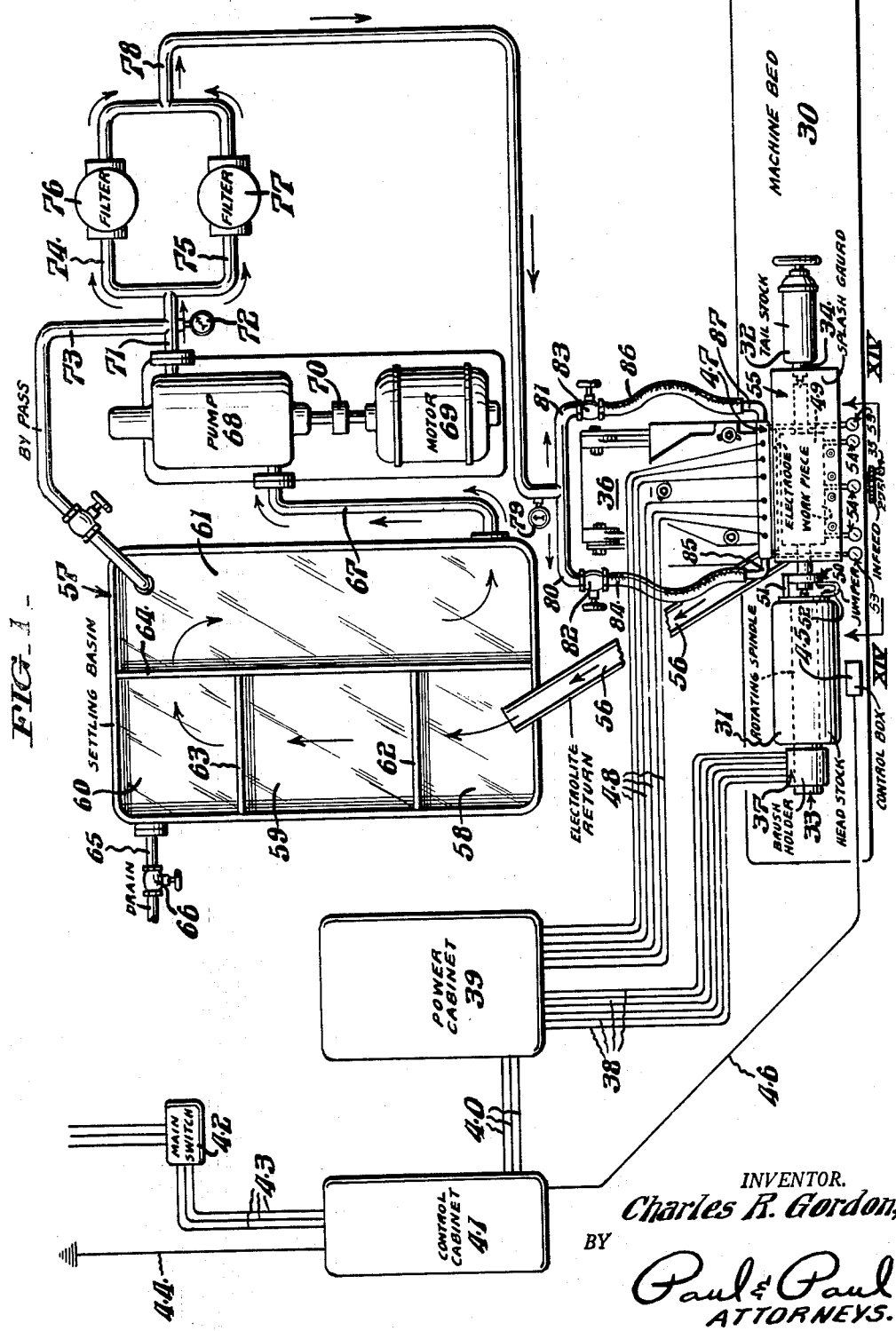

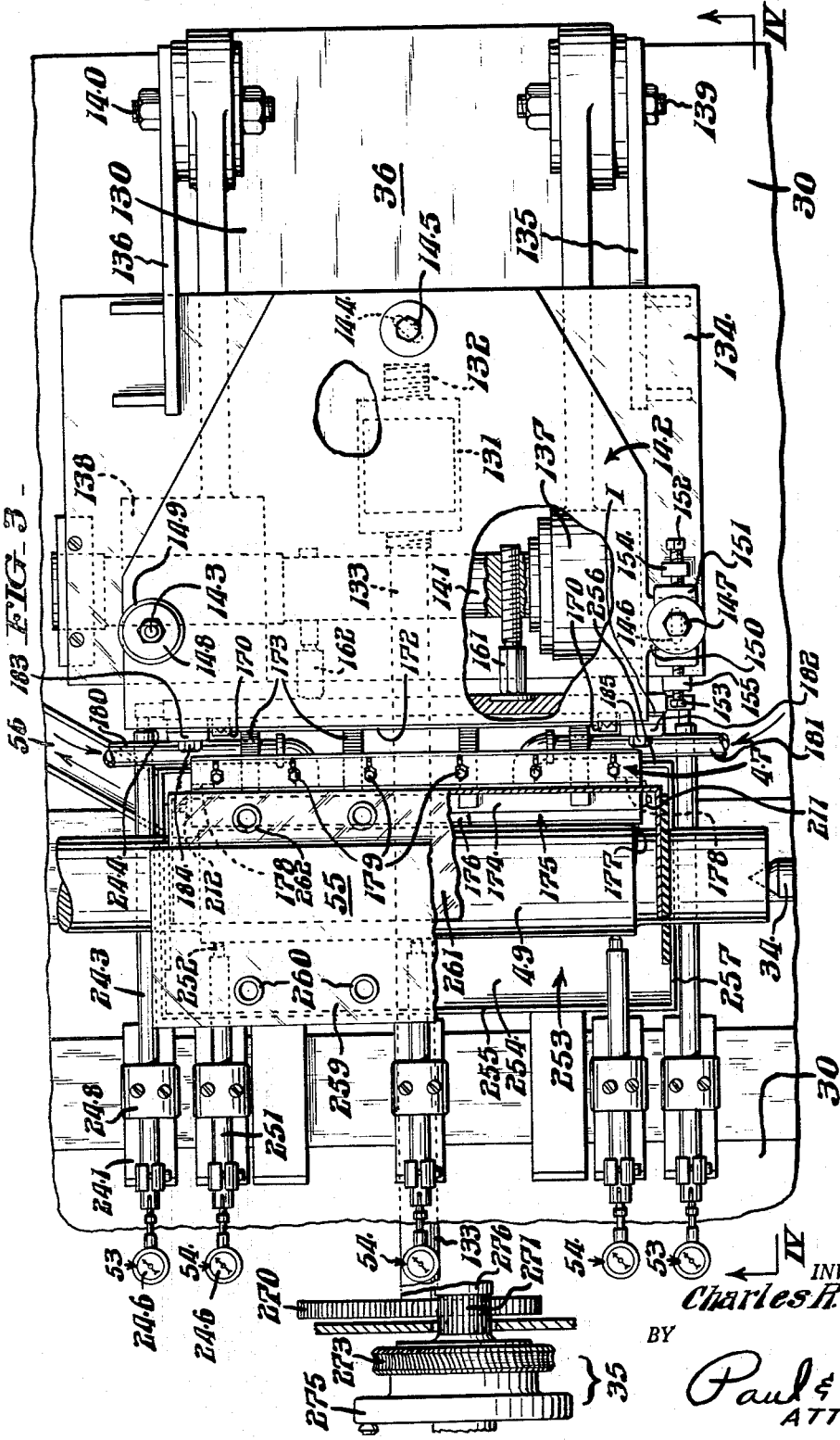

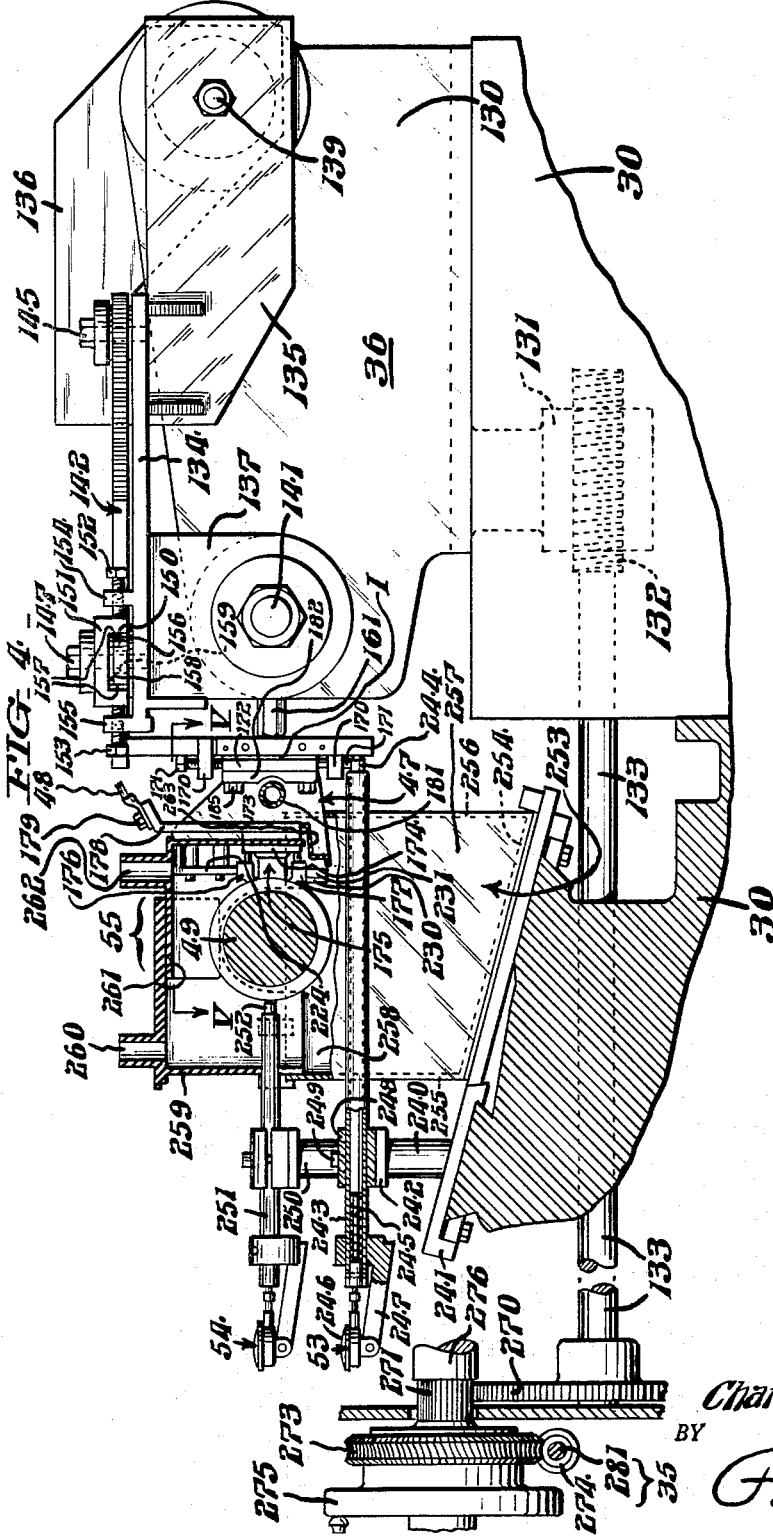

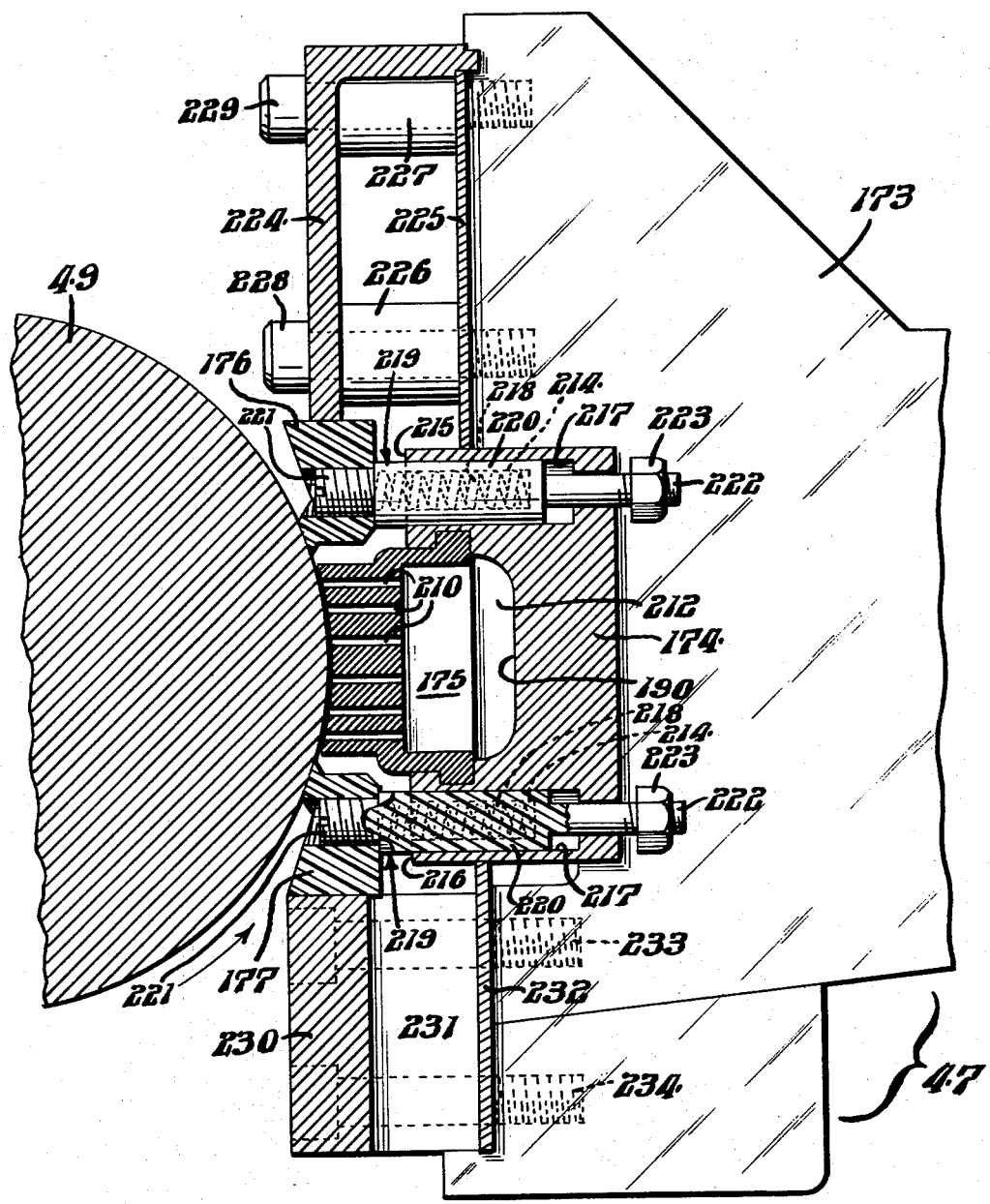

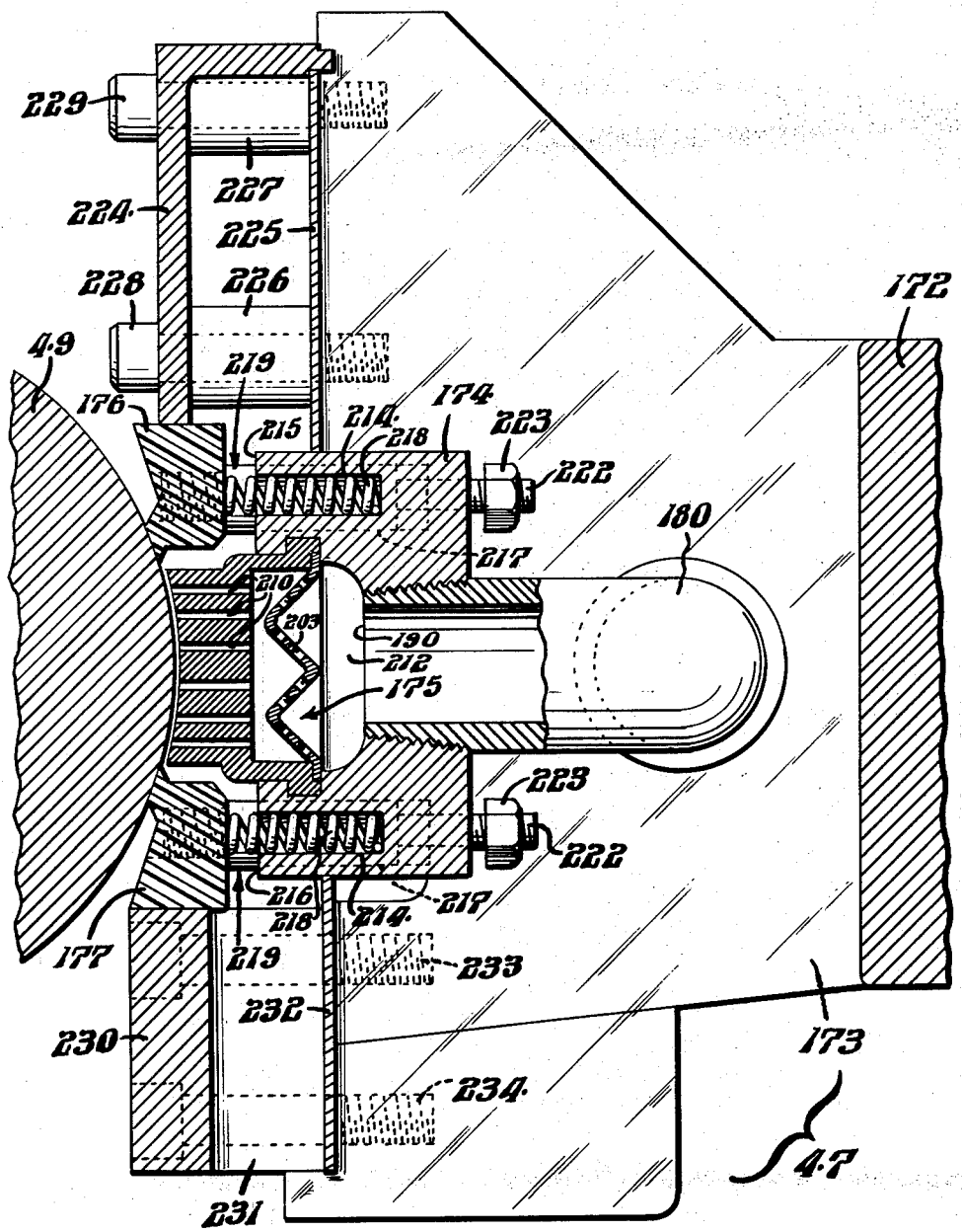

May 17, 1966  C. R. GORDON  3,251,762
ELECTRODE FOR ELECTROLYTIC METAL SHAPING
Filed Aug. 24, 1961  11 Sheets-Sheet 7
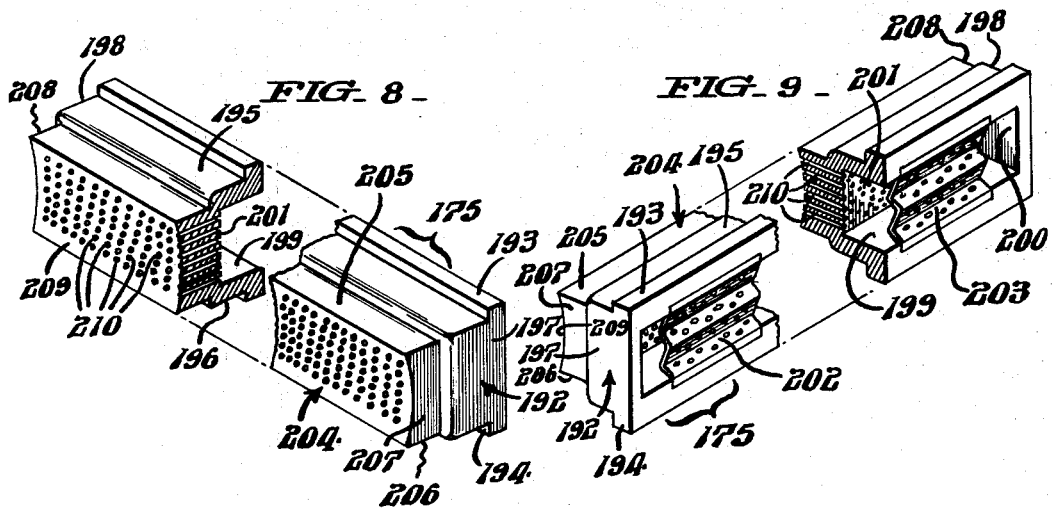
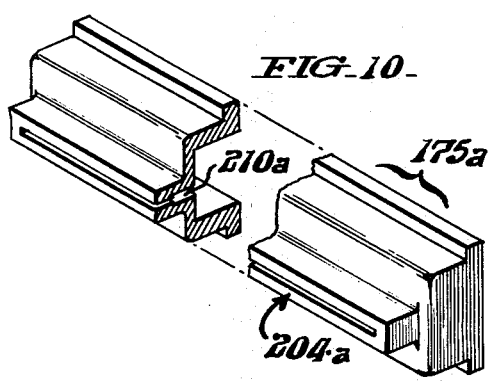
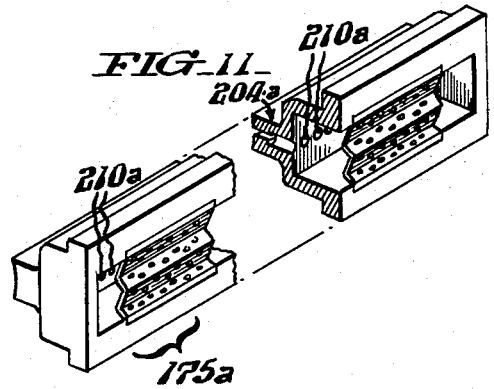
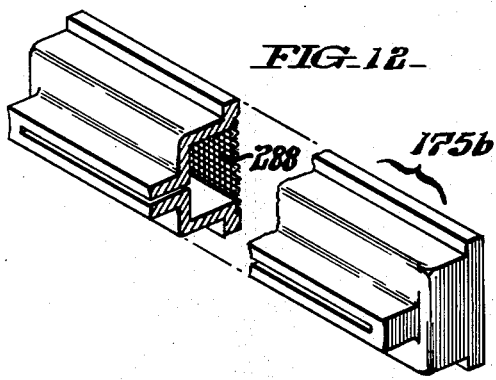
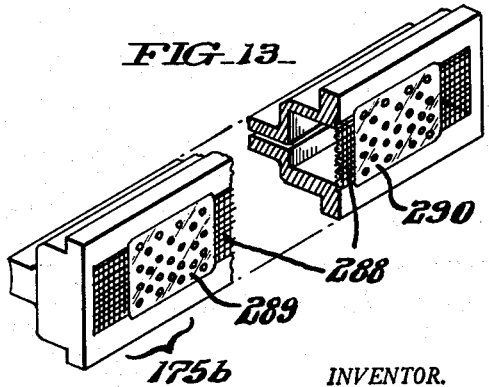
INVENTOR.
Charles R. Gordon,
BY
Paul & Paul
ATTORNEYS.

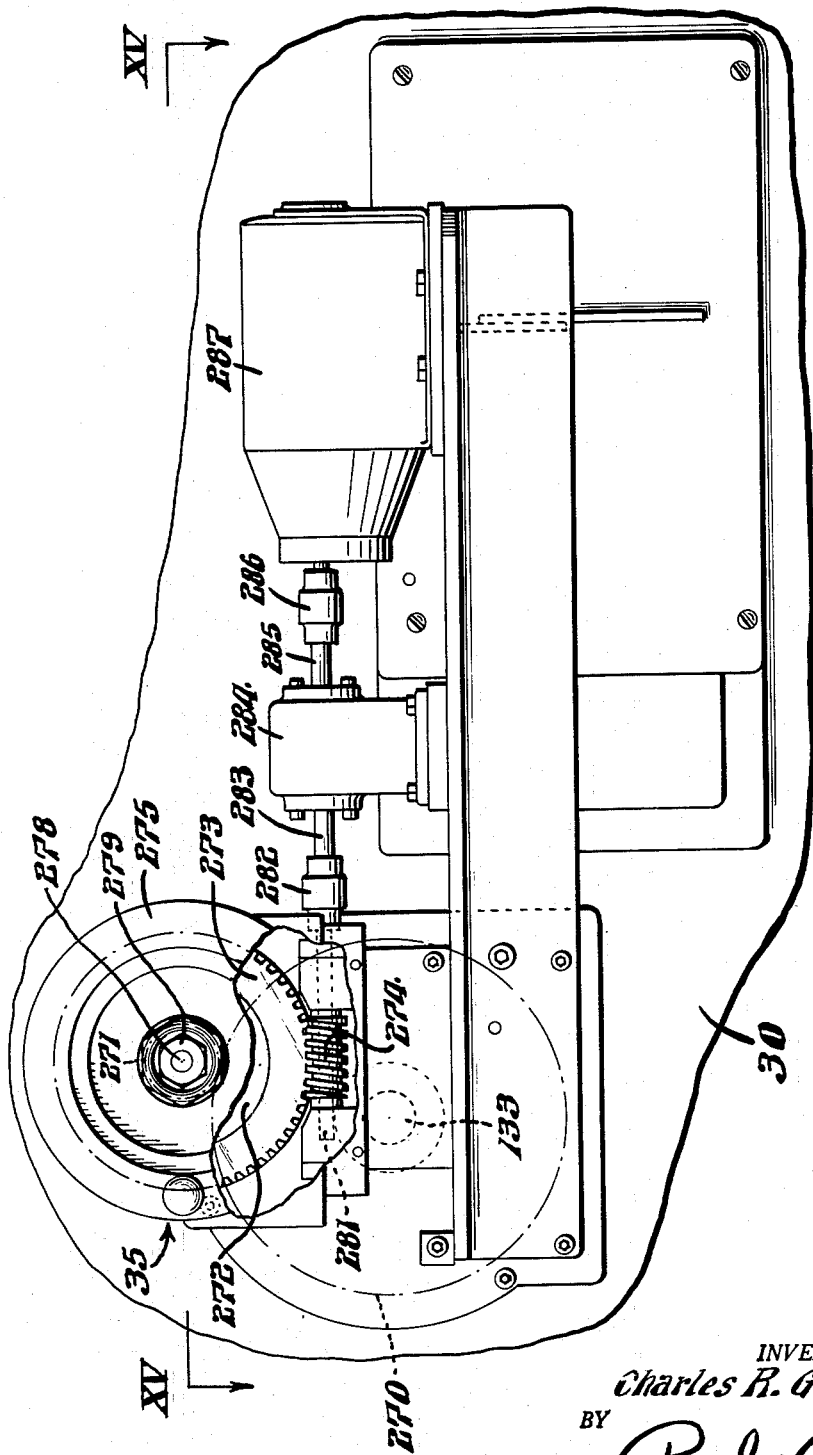

May 17, 1966 C. R. GORDON 3,251,762
ELECTRODE FOR ELECTROLYTIC METAL SHAPING
Filed Aug. 24, 1961 11 Sheets-Sheet 9
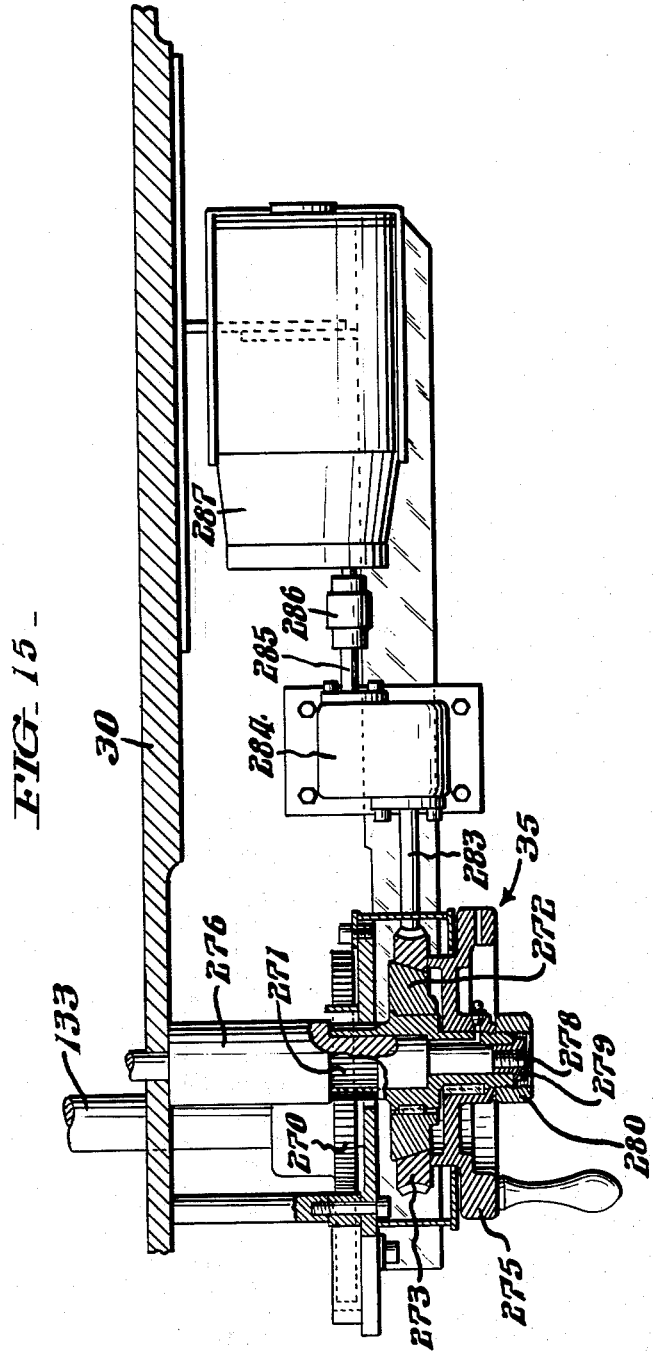
INVENTOR.
Charles R. Gordon,
BY
Paul & Paul
ATTORNEYS.

May 17, 1966 C. R. GORDON 3,251,762
ELECTRODE FOR ELECTROLYTIC METAL SHAPING
Filed Aug. 24, 1961 11 Sheets-Sheet 10
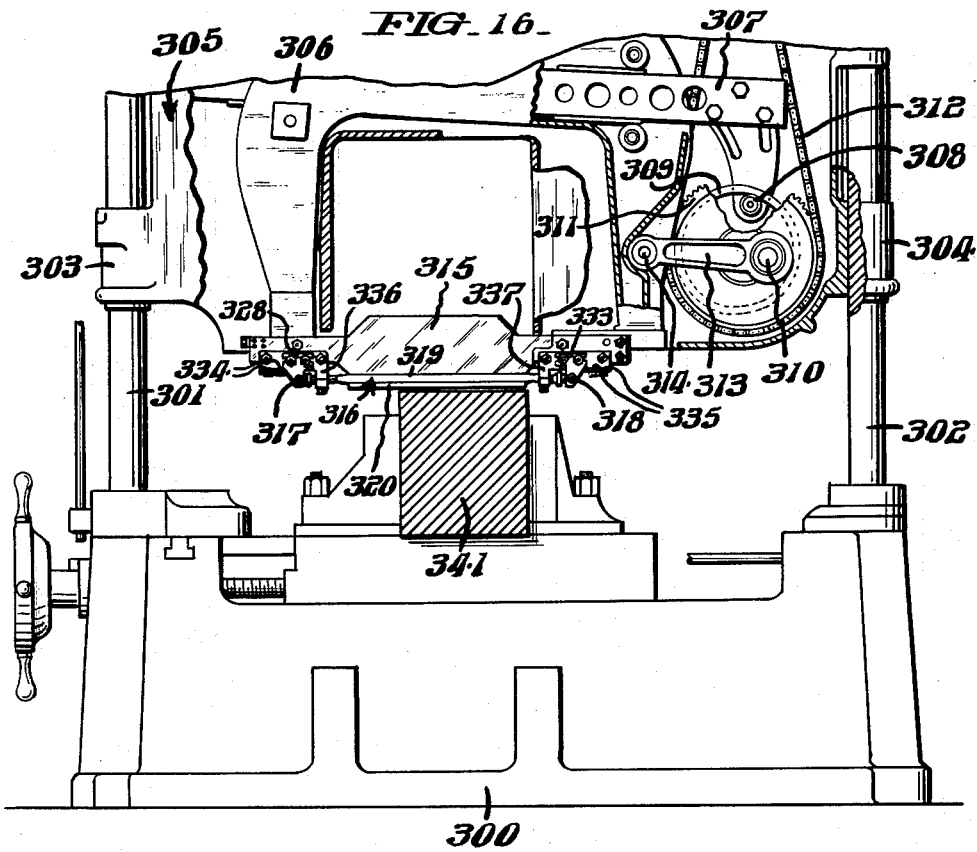
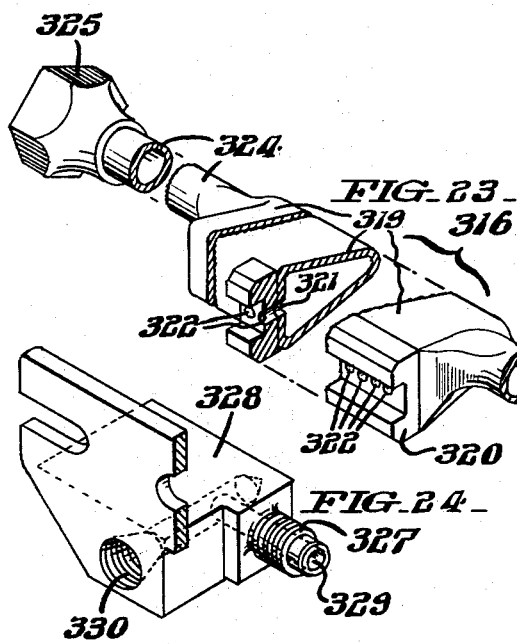
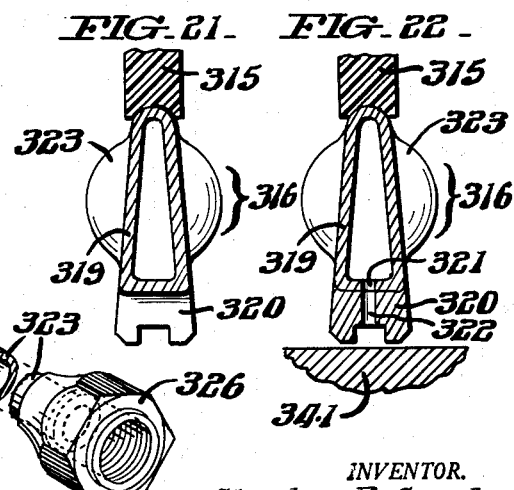
INVENTOR.
Charles R. Gordon,
BY
Paul & Paul
ATTORNEYS.

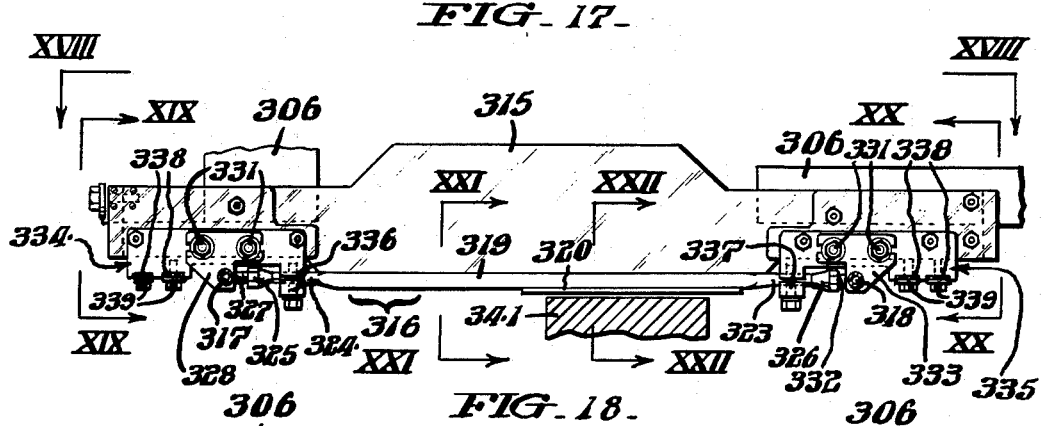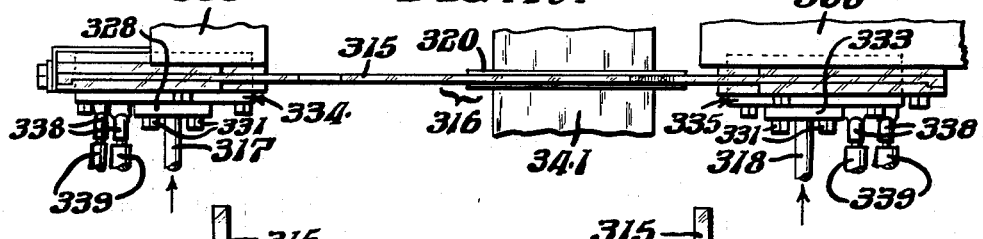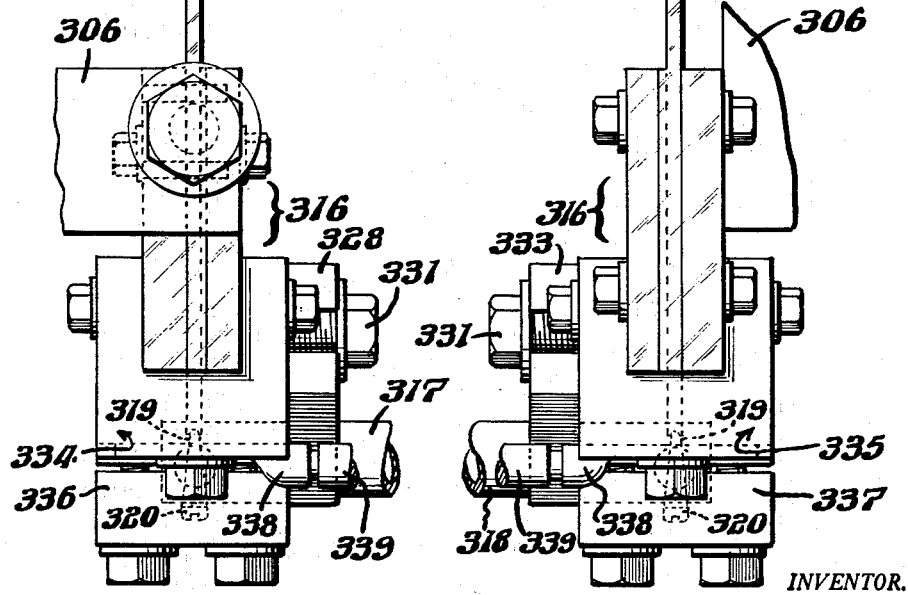

# United States Patent Office 3,251,762
Patented May 17, 1966

3,251,762
ELECTRODE FOR ELECTROLYTIC METAL SHAPING
Charles R. Gordon, Philadelphia, Pa., assignor to Midvale-Heppenstall Company, Nicetown, Pa., a corporation of Pennsylvania
Filed Aug. 24, 1961, Ser. No. 133,613
2 Claims. (Cl. 204—284)

This invention relates to a process and apparatus for the electrolytic shaping of solid metal objects, and more particularly it relates to such a process and apparatus whereby the metal object is shaped entirely by electrolytic action.

With the increasing tendency towards the use of harder metals and alloys in industrial embodiments, the feasibility of working such metallic substances by conventional methods such as sawing, grinding, milling and the like has lessened by reason of the fact that it has become increasingly difficult to find ever harder tools with which to accomplish the desired metal removal. In recent years, however, various attempts have been made to utilize the phenomenon of electrolytic action in combination with conventional working procedures in order to assist in the grinding of these harder metals. Additionally, some attempts have been made to provide totally electrolytic means for working solid metal objects, but this development has been limited by the attendant problems of insulation and metal removal caused by the electrolytic action.

It is therefore an object of this invention to provide a process and apparatus whereby metallic objects may be worked so as to remove metal from the surface thereof by purely electrolytic action.

It is another object of this invention to provide such a process and apparatus whereby metal may be removed from the surface of an elongated metal object at a substantially equal rate throughout the length thereof.

It is another object of this invention to provide such a process and apparatus which facilitate the handling of the metal removed from a work object during the electrolytic working of a metal object.

It is another object of this invention to provide a novel electrode construction for use in the electrolytic removal of metal from a metal work object.

It is another object of this invention to provide a method and apparatus for the continuous recovery and conditioning of electrolyte utilized in accordance with the process of this invention.

Other objects and advantages of the process and apparatus of this invention will become readily apparent from a reading of the following specification and drawings wherein:

FIG. 1 is a schematic plan view of the apparatus of this invention utilized in the grinding of a cylindrical metal work object;

FIG. 2 is an enlarged sectional view showing the details of certain of the electrical connections indicated schematically in FIG. 1;

FIG. 3 is an enlarged partial plan view with certain parts in section and certain parts broken away of the apparatus of FIG. 1;

FIG. 4 is a vertical sectional view taken along the lines and in the direction of the arrows IV—IV of FIG. 3;

FIG. 5 is a plan view in section taken along the lines and in the direction of the arrows V—V of FIG. 4;

FIGS. 6 and 7 are sectional views taken generally along the lines and in the direction of the arrows VI—VI and VII—VII of FIG. 5;

FIG. 8 is a front perspective view in partial section of an electrode for use in the apparatus of this invention;

FIG. 9 is a rear perspective view in partial section of the electrode shown in FIG. 8;

FIG. 10 is a front perspective view in partial section of another electrode embodiment of this invention;

FIG. 11 is a rear perspective view in partial section of the electrode shown in FIG. 10;

FIG. 12 is a front perspective view in partial section of another electrode embodiment of this invention;

FIG. 13 is a rear perspective view in partial section of the electrode shown in FIG. 12;

FIG. 14 is an enlarged partial front elevational view taken as indicated by the lines and arrows XIV—XIV in FIG. 1;

FIG. 15 is a sectional view taken along the lines and in the direction of the arrows XV—XV in FIG. 14;

FIG. 16 is a partial elevational view, parts being broken away and certain parts being in section, showing a modification of the apparatus of this invention for use in the sawing of metal work objects;

FIG. 17 is an enlarged view of the electrode assembly of the apparatus shown in FIG. 16;

FIG. 18 is a sectional view taken along the lines and in the direction of the arrows XVIII—XVIII of FIG. 17;

FIG. 19 is a sectional view taken along the lines and in the direction of the arrows XIX—XIX of FIG. 17;

FIG. 20 is a sectional view taken along the lines and in the direction of the arrows XX—XX of FIG. 17;

FIG. 21 is a sectional view taken along the lines and in the direction of the arrows XXI—XXI of FIG. 17;

FIG. 22 is a sectional view taken along the lines and in the direction of the arrows XXII—XXII of FIG. 17;

FIG. 23 is an enlarged perspective view in partial section of certain details of the electrode assembly of the apparatus shown in FIG. 16;

FIG. 24 is an enlarged perspective view of a portion of the apparatus shown in FIG. 16.

Referring now to FIG. 1, there is shown in schematic form the apparatus of this invention including a conventional metal grinding machine bed 30, a headstock 31, a tailstock 32, a rotatable headstock spindle assembly 33 journalled in the headstock 31, a handwheel assembly 35, and a supporting assembly 36 for a conventional grinding machine infeed mechanism, which has been modified for use in the apparatus of this invention.

A commutating brush holder 37 is shown schematically mounted adjacent the headstock 31, said holder having the distal end of the rotatable spindle 33 journalled therein in electrical commutating relationship therewith. A plurality of electrical conductors 38 connect the brush holder 37 to the positive terminals of a direct current electrical power supply system contained in a power cabinet 39, which is in turn connected by conductors 40 to an electrical control cabinet 41. Line power is delivered from a main switch 42 through conductors 43 to the control cabinet 41, the entire electrical system being grounded through a ground wire 44, and the system being distantly controlled from a control box 45 mounted in proximity to the machine bed 30, the control box in turn being connected to control cabinet 41 through line 46. The negative terminals of the power cabinet 39 are connected to an electrode assembly 47 through lines 48, the electrode assembly being adjustably mounted for movement upon the supporting assembly 36.

A metal workpiece 49, shown partly in dotted lines is mounted on centers between a tailstock spindle 34 and headstock spindle 33 assembly for rotation therewith. Positive rotation of the workpiece 49 is provided by means of a conducting clamp 50 attached to said workpiece, which is in turn drivingly linked to the headstock spindle assembly 33 by an integral arm 51, and electrically connected thereto by a jumper 52. A pair of measuring indicator means 53 are mounted in measuring relationship with electrode assembly 47, and three measuring indicator means 54 are mounted in measuring relationship with the workpiece 49. A nonconducting splash guard 55 is mounted in covering relationship with the workpiece 49, and a nonconducting chute 56 is positioned in communicating relationship with the area disposed below the metal workpiece 49 for a purpose to be hereinafter described. The discharge end of chute 56 communicates with a settling basin 57, which is in turn divided into a plurality of settling compartments 58, 59, 60 and 61 by a plurality of weirs 62, 63 and 64. Settling basin 57 is provided with a drain pipe 65 and a drain valve 66. A conduit 67 communicates between the settling basin 57 and the inlet side of a pump 68, which is in turn driven by a motor 69 through a coupling 70. The electrical system associated with motor 69 is not shown and is conventional. The outlet side of pump 68 discharges into a conduit 71, which is provided with a pressure gauge 72 operably associated therewith, and a by-pass conduit 73 communicating therewith and discharging adjacent the interior of settling basin 57. Conduit 71 is bifurcated into a pair of branched conduits 74, 75, said conduits having filters 76, 77 respectively mounted therein. Conduits 74 and 75 converge to form a single conduit 78 on the outlet side of the filters 76, 77. Conduit 78 has a pressure gauge 79 operably associated therewith and communicates with a pair of branched conduits 80, 81, each of which has a hand controlled valve mounted at the discharge end thereof. Valve 82 communicates with a flexible line 84 which in turn connects with the interior of the electrode assembly 47 by means of a rigid elbow 85. Similarly, the valve 83 communicates with a flexible line 86 which in turn connects into the interior of electrode assembly 47 through a fixed elbow 87.

General operation

In practicing the process of this invention with the apparatus shown in FIG. 1, and above described, the settling basin 57, is first partially filled with an electrolyte, such as a sodium chloride solution or the like. The workpiece 49, which may be a generally cylindrical metallic forging or the like, is mounted on centers as above-described, and the splash guard 55 positioned thereon. The clamp 50 is tightened on the workpiece 49 and the electrode assembly 47 advanced toward the workpiece 49 by operating an infeed mechanism, hereinafter described in detail, to within about .005 to about .010 inch thereof. With the electrode in this position, the spindle assembly 33 is then rotated by a conventional mechanism (not shown) and the pump 68 started by means of motor 69; the output pressure of the pump being set at from about 180 to about 200 pounds per square inch gauge. This is a preferred operating pressure range, although higher pressures may be used. However, it is important that pressures substantially below 180 pounds per square inch gauge not be used. In this manner, electrolyte is caused to flow from the settling tank 57 through conduit 67, pump 68, conduits 71, 74, 75, filters 76, 77, conduits 78, 80, 81 and flexible lines 84, 86, into the electrode assembly 47, wherefrom it is discharged against the rotating workpiece 49 at substantially gauge pressure. At this time, the power unit in cabinet 39 is energized by actuation from the control cabinet 41 and control box 45, and the voltage and amperage therein adjusted for non-arcing operation, this depending upon the diameter and length of the workpiece 49. In this manner, metal is electrolytically removed along the surface of workpiece 49, which is subjected to the discharge of electrolyte from the electrode assembly 47, and the rate of removal sensed by the gauges 54. The infeed mechanism is then set to automatically control the advance of the electrode assembly 47 at a rate such that gauge 53 are always substantially matched to the rate of removal as indicated by gauges 54. The pressure of the electrolyte against the workpiece 49 causes the entrained metal removed from the workpiece to be carried away from the surface of the metal as it is dislodged, said entrained metal and electrolyte being discharged into and through trough 56, into settling compartment 58 of settling basin 57, wherein the entrained metal is settled out of the electrolyte. Overflowing electrolyte passes weir 62 into compartment 59 for further settling, then passes weir 63 for further settling in compartment 60 and then passes weir 64 into compartment 61 for final settling, wherefrom clarified electrolyte is again withdrawn into conduit 67 for continuation of the process. As soon as the required metal removal throughout the length of workpiece 49, has been accomplished, as indicated by the gauges 54, the power unit 49 is shut-off, splash guard 55 removed, and the workpiece 49 cleaned of electrolyte.

Referring now to FIG. 2, there is shown the means of connecting the rotating headstock spindle assembly 33 both mechanically and electrically to the end of the work piece 49. The spindle assembly 33 is journalled within a bore 88 formed longitudinally of headstock 31, and comprises an integral spindle having a main portion 89 and a reduced width portion 90, each portion having a generally cylindrical bore 91 running mutually therethrough. The spindle main portion 89 has a face plate 92 affixed thereto by means of a plurality of cap screws 93 (not shown). The clamp 50 is affixed to the one end of the work piece 49. Clamp 50 comprises two half portions 94, 95 which are complementally bored and threaded, whereby they are held in clamping relationship with the work piece 49 by a pair of cap screws 96 (one shown). One end of arm 51 is affixed to clamp 50 on the half portion 95 by means of the bolts 97. The other end of arm 51 is affixed in a slotted portion of face plate 92, and an electrical jumper 52 is affixed in electrical contact to the half portion 94 of clamp 50 by means of a bolt 98, and is affixed in electrical contact to the main portion 89 of the spindle by means of a bolt 99. Face plate 92 has a central bore 100 formed therein, which serves to support a lathe center 101 for rotation therewith by means of a tapered fit therein. One end of work piece 49 is centered on lathe center 101. A tailstock lathe center (not shown) corresponding to center 101 is provided in tailstock spindle 34, and the other end of the work piece 49 centered thereon. The main spindle portion 89 is electrically insulated from the bore 88 of headstock 31 by means of a flanged liner 102, which is constructed of insulating material such as Teflon or the like. The reduced width portion 90 is axially positioned within bore 88 by means of an annular cap 103 and a flanged insulating bushing 104, which is likewise constructed of an insulating material such as Teflon or the like. Cap 103 is affixed to the headstock 31 by means of a plurality of cap screws 105 (one shown).

The headstock spindle assembly 33 further comprises a spindle extension consisting of a cylindrical portion 108, having an external diameter substantially that of the internal diameter of the spindel bore 91, so as to permit a tight fit therewith. Formed integrally of portion 108 and disposed without the bore 91 of reduced width portion 90 is an enlarged cylindrical portion 109. The integral portions 108 and 109 of the spindle extension are concentrically disposed and composed of conducting material such as copper, or the like. Disposed concentrically about portion 109 is a brush holder assembly 37 which comprises a generally cylindrical housing 111 having a flange 112 formed at one end thereof, and a plurality of axially aligned openings 113 formed therein. A number of commutating brushes 114 are disposed within openings 113 in a loose fitting relationship therewith, and held therein in commutating contact with the cylindrical portion 109 by means of a plurality of coil springs 115 which have insulated coverings formed thereon, and a plurality of holding clips 116 which are affixed to the housing 111 by means of threaded bolts 117. A terminal bracket 118 is welded to and extends from the housing 111, and has formed thereon terminals 119 whereto are connected the power lines 38. The flange 112 and annular cap 103 have formed therein two series of complementary openings, one series 120 being aligned so as to limit cap screws 105 for the purpose of affixing cap 103 to the headstock 31; the other series 121 being aligned whereby a plurality of cap screws 122 are utilized to affix the brush holder assembly to the cap 103. A washer 123, formed from insulating material such as Teflon or the like, is disposed between the complementally configured face portions of flange 112 and cap 103, whereby electrical contact therebetween is prevented.

As thus described, it will be clear then that when the conventional drive mechanism for the spindle of the headstock 31 is actuated, and the power system hereinabove described turned on, a rotation of work piece 49 is effected, and at the same time a direct electric circuit conducted from the terminals 119 to the work piece 49.

Referring now to FIGURES 3 and 4, there is shown the means for holding the work piece 49 and the electrode assembly 47 in relative positions such that metal may be removed from the work piece 49 in accordance with the process of this invention. The supporting assembly 36, as shown in greater detail in FIGS. 3 and 4 includes a movable support 130, which support has a dependent feed nut 131 (shown in dotted lines), which is internally threaded, and receives an endless screw 132, which is formed at the end of an infeed shaft 133. A supporting plate 134 is mounted above support 130 in a generally horizontal plane by means of a pair of bracket arms 135, 136, dependent brackets 137, 138, and their corresponding shafts 139, 140, 141, which are journalled in portions of support 130. A generally L-shaped knee bracket 142 is disposed with its long side superposed above the supporting plate 134 such that the short side of the knee bracket 142 depends generally vertically and forward of support 130 and spaced free thereof. Movement and orientation of knee bracket 142 is provided by means of a pivot bolt 143, slot 144, cap screw 145, slot 146 and bolt 147. Pivot 143 is secured in supporting plate 134 and has disposed therearound an insulating pad (not shown) positioned between the surface of supporting plate 134 and the undersurface of knee bracket 142, and additionally is provided with washers 148, 149. The cap screw 145 passes through arcuate slot 144 and terminates in supporting plate 134 and is insulated therefrom. Similarly bolt 147 passes through arcuate slot 146 and is fixed in supporting plate 134. Slot 146 is formed in a projecting tab 150 of knee bracket 142 in close conformity with an inverted generally U-shaped yoke 151 which is adjustably supported by means of set screws 152, 153, which are in turn threaded in supports 154, 155, these being affixed to knee bracket 142. The tab 150 is supported away from supporting plate 134 by means of an insulating pad 156, and similarly supported away from the surfaces of yoke 151 by insulating pads 157, 158. A cylindrical sleeve 159 surrounds bolt 147 within the arcuate slot 146. The position of knee bracket 142 is adjusted by regulating the set screws 152, 153. Shaft 141 connects depending brackets 137, 138 and provides a supporting means for a pair of backup screws 161, 162, which are complementally threaded and journalled in threaded bores formed diametrically in shaft 141, whereby providing adjustable backup support for the vertically depending side of knee bracket 142.

Refering now to FIGURES 3, 4 and 5 there will be seen in greater detail the means for supporting the electrode assembly 47. The vertically depending side of knee bracket 142 has affixed thereto two pair of lugs 170 each lug having threaded therethrough a cap screw 171. Each cap screw 171 is seated in and supports a rigid elongated plate 172, which plate has affixed thereto a plurality of brackets 173, which extend normally to the face surface of plate 172 and which are adapted to partially surround an elongated electrode holder 174, which in turn is adapted to retain therewith an electrode 175. Plate 172 is insulated from the depending leg of knee bracket 142 by insulation I. The brackets 173 are also adapted to support a pair of elongated wipers 176, 177 in parallel alignment with said electrode, and closely adjacent thereto in contact with work piece 49. Affixed to the back of the electrode holder 174 are cable bars 178, which have provided thereon a plurality of terminals 179 for the attachment of conductors 48 thereto. Two electrolyte inlet pipes 180 and 181, which form extensions of elbows 85, 87 terminate through elbows in electrode holder 174. Plate 172 is slotted at the ends thereof and held in position by brackets 182, 183 and bolts including bolts 184, 185.

Referring now to FIGURES 6, 7, 8 and 9, there is shown in greater detail the electrode assembly 47. As there shown, the brackets 173 have cut out portions formed therein which complementally surround a portion of the electrode holder 174. Electrode holder 174 is formed with a generally rectangular cross section and comprises an elongated solid body portion having a hollowed-out trough 190 formed therein, the sides of the trough being machined so as to conform to the external dimensions of the electrode 175, whereby a tight fit therebetween is obtained. The electrode 175 consists of a generally rectangular parallelopiped base portion 192 including outturned flanges 193, 194 and generally parallel side portions 195, 196, and end portions 197, 198. The inside of base portion 192 is hollowed out, thereby forming a chamber comprising walls 199, 200, and their companion opposing walls, and a bottom wall 201. A pair of crimped foraminous baffle plates 202, 203 are inset into the bottom surfaces of flanges 193, 194, whereby they bridge the open chamber formed by walls 199, 200, etc. The top portion of the electrode 175 is elongated and somewhat narrower than base portion 192, and is bounded by walls 205, 206, 207 and 208, and has a concave face surface 209. Top portion 204 has formed therein a plurality of small diameter mutually parallel bores 210, which extend from the bottom wall 201 through the face surface 209. Bores 210 are closely spaced in a generally equidistant relationship from each other and are distributed substantially throughout the whole area of face surface 209. Electrode 175 is preferably constructed from copper metal, but other conducting metals or alloys thereof may be used. The degree of concavity of face surface 209 may be varied, and as shown in FIGURE 7, is conveniently formed so as to complement the degree of curvature of a cylindrical metal work piece 49. When the electrode 175 is in its assembled position with electrode holder 174, the open ends of trough 190 are sealed by means of end plates 211, 212 by a plurality of bolts 213. Pipe 180 is connected into the trough 190 and the chamber of electrode 175 by means of a threaded connection through the rear portion of holder 174, as shown in FIGS. 5 and 7. Similarly pipe 181 is likewise connected into holder 174. The conduit of pipe 180 discharges in a line normal to the baffle 203 and the conduit of pipe 181 discharges in a line normal to the baffle 202.

A plurality of recessed bores 214 are arranged in spaced relationship along a generally linear locus in each of the surfaces 215, 216. A plurality of second bores 217 are likewise spaced along the same linear loci of surfaces 215 and 216 intermediate of bores 214. A plurality of coil springs 218 are disposed in each of the first bores 214. The bottoms of the second bores 217 are drilled completely through to the back surface of holder 174, and a plurality of adjustable studs 219 are disposed therein. Studs 219 are composed of an insulating material such as nylon or the like and consist of a barrel portion 220 having a diameter substantially equal to that of the diameter of bores 217, for sliding relationship therewith. Extending axially from barrel portion 220 in one direction is an integral threaded head portion 221 of slightly smaller diameter than barrel portion 220, and extending axially in the other direction is an integral partially threaded stud portion 222. Stud portions 222 extend through the drilled bottoms of bores 217, and extend beyond the back surface of holder 174. Adjusting nuts 223, disposed on stud portions 222, provide retaining means therefor.

The wipers 176, 177, as shown in detail, are irregularly shaped and have formed throughout the length thereof along a generally linear locus a series of threaded holes in complementally spaced positions to the second bores 217 of electrode holder 174.

A generally L-shaped elongated bar 224 is disposed with its longitudinal axis parallel to that of the holder 174, the electrode 175 and the wipers 176, 177, and is abutted to the brackets 173 and wiper 176, and secured in its spaced relationship therewith by means of an elongated plate 225, a series of bored spacers 226, 227 and a series of cap screws 228, 229 which are secured into tapped and threaded holes in the brackets 173. Similarly, a bottom bar 230 having flanged end portions 231 is abutted to wiper 177 and brackets 173, and secured in its relative relationship therewith by means of a plate 232, and a series of socket screws 233, 234 which are also threaded into tapped and threaded openings in brackets 173.

As shown in FIGURES 4, 5, 6 and 7, the completed electrode assembly 47 provides for the support of the electrode 175 in closely spaced relationship to the surface of a work piece 49 and at the same time provides for contact of the work piece 49 by wipers 176, 177 under spring pressure by reason of the compressed coil springs 218 disposed within bores 214. Movable support for the wipers 176, 177 is provided by the barrel portion 220 of adjusting studs 219. It will be apparent that the limit of extension of barrel portions 220 from within bores 217 is varied by means of nuts 223. Additionally, bearing surfaces for the lateral movement of wipers 176, 177 are provided by the lower and upper edges respectively of the top bar 224 and bottom bar 230.

Referring now to FIGS. 3 and 4, the indicators 53 are supported in their measuring relationships by means of stands 240, which are in turn mounted vertically upon a base plate 241, which is in turn secured to the machine bed 30. An insulating block 242 provides insulated support for the indicator 53 which consist of a cylindrical casing 243, an indicator rod 244 of slightly smaller diameter than, and disposed within and extending from casing 243; a spring 245 disposed concentrically about a reduced diameter extension of rod 244 and a conventional dial indicator 246, which is supported in registering relationship with indicator rod 244 by a bracket 247. A suitable dial indicator is that identified as Catalog No. 263, manufactured by A. C. Ames Co., Waltham, Mass. A cap 248 and bolt 249 serve to clamp the casing 243 rigidly to the insulating block 242, in such a manner whereby the indicator rod 244 abuts the forward surface of the distal end of the depending leg of knee bracket 142. A plurality of stands 250 provide similar supporting means for indicators 54, which consist of identical elements with those composing indicators 53, except that indicators 54 include a short casing 251 and corresponding short indicator rod 252. Moreover, indicators 54 are so supported that the indicator rods 252 thereof abut the work piece 49 at a point on the circumference substantially the middiameter of a cylindrical work piece 49.

Still referring to FIGURES 3 and 4, the splash guard 55 consists of a well portion 253, which had a solid sloping bottom 254 and walls 255, 256, 257 and 258, being open at the top. A top splash guard portion 259 having gas outlets 260 formed therein and a rear splash guard 261 having gas outlets 262 formed therein. All of the elements of splash guard 55 are constructed from a non-conducting material, preferably a transparent material such as methyl methacrylate plastic or the like. A drip pan 263 is suitably affixed to brackets 173 and is disposed generally below the electrode assembly 47.

Referring now to FIGURES 1, 3, 4, 14 and 15, there is shown the driving means for the infeed shaft 133, which consists generally of an infeed gear 270 which is keyed to the infeed shaft 133, a pinion sleeve 271, a friction cone 272, a worm gear 273, a worm 274, and a hand wheel 275. The pinion sleeve 271 has its toothed portion formed at a distal end thereof and has formed therein a central bore which is of varying diameters and is rotatably journalled on an idler shaft 276, which is in turn supported by a portion of the support 30. Shaft 276 is formed with varying external diameters complementally corresponding to the varying internal diameters of the bore of sleeve 271. Pinion sleeve 271 is held in its rotatable disposition with respect to shaft 276 by means of the threaded stud portion 278 thereof and the nut 279. The friction cone 272 is keyed to an enlarged portion of the pinion sleeve 271, and likewise the hand wheel 275 is keyed to another enlarged portion of pinion sleeve 271, and held thereon by means of a nut 280. The worm gear 273 is annularly formed and has its internal surface complementally configured to the driving surface of the friction cone 272 for a frictionally driving relationship therewith.

The worm 274 is formed at the end of a worm shaft 281, which is in turn connected through a coupling 282 and a shaft 283 to a speed reducer 284, which is in turn connected through a shaft 285 and coupling 286 to a variable speed motor 287.

*Operation*

The above described embodiment of the apparatus of this invention is placed into operation by first filling the settling basin 57 with the desired electrolyte solution, to a suitable level above the outlet communicating with conduit 67, the drain valve 66 being closed. The by-pass conduit 73 is placed in open condition, and valves 82 and 83 placed in open position. The work piece 49, which suitably has a generally cylindrical surface, is placed in the centers of tailstock 32 and headstock 31 and the clamp 50 tightly secured to the end of work piece 49 adjacent headstock 31.

The electrode 175 is advanced to a position such that its arcuate surface 209 is within about .005 to about .010 inch of the surface of work piece 49 by turning hand wheel 275, which overcomes the friction coupling between worm gear 273 and the friction cone 272, thereby actuating the infeed shaft 133 and advancing the movable support 36 upon which the electrode assembly 47 is mounted. The indicator rods 244, 252 are set respectively in measuring relationship with the knee bracket 142 and the work piece 49. The conventional driving means of headstock 31 is then actuated and adjusted to rotate work piece 49 at approximately 50 surface feet per minute. The motor 69 is energized and the controls of pump 68 adjusted whereby a circulation of electrolyte through the conduits 67, 71, 74, 75, 78, 80, 81, and flexible lines 84, 86, is effected to discharge electrolyte from the electrode 175 through the bores 210 thereof and against the surface of the work piece 49 at a pressure of between about 180 to 200 pounds per square inch gauge. In this manner, electrolyte is forced evenly and at high pressure throughout the length of work piece 49 wherefrom it is gathered by and conducted from the splash guard 55 and returned to the settling basin 57 through chute 56. Then, by actuating the controls contained in control box 45, direct electric current is caused to pass from power cabinet 39 through conductors 38, brush holder 37, spindle assembly 33, jumper 52 and clamp 50, into work piece 49. The current then passes out of work piece 49 through the electrolyte and into the insulated electrode 175, then out of the electrode assembly 47 by means of cable bars 178, terminals 179 and conductors 48, thereby returning to the power cabinet 39. There is thus established an electrolytic reaction in which the work piece 49 constitutes the cathode and electrode 175 constitutes the anode, which reaction results in the electrolytic removal of metal from the surface of work piece 49. The metallic material thus removed is entrained in the electrolyte and is immediately flushed away from the surface of work piece 49 by means of the high pressure electrolyte stream passing from the bores 210 of electrode 175, this action being aided by the wiping affect of the wipers 176, 177 which insulatingly contact the surface of the work piece 49 on either side of the electrode 175. The electrolyte and entrained metallic material removed from work piece 49 return through chute 56 into the settling compartment 58 of the basin 57, whereupon a settling of some metallic material occurs and overflowing electrolyte with remaining entrained metallic material is carried over weir 62 into compartment 59, and then successively over weirs 63, 64 for further settling of metallic material in the remaining compartments 60, 61, thereby providing for a gradual refinement of the electrolyte. Filters 76, 77 are provided for the purpose of entraining any remaining metallic material so as to insure the passage of electrolyte free from metallic material out through conduits 74, 75 and 78, thereby preventing the clogging of any of the relatively small bores 210. This precaution is important in that the assurance of an evenly distributed supply of electrolyte along the entire surface length of work piece 49 is necessary in order to provide for even removal of metal at the surface thereof during the electrolytic reaction. As metal is removed at the surface of the work object 49, this removal is sensed by the dial indicators 246 in association with the indicator rods 252 which are in abutment with the circumference of the work piece 49. The variable speed motor 287 is adjusted to provide for an infeed advance of the electrode 175 at a suitable rate determined by the hardness of the metal comprising work piece 49, the indicated rate of removal being then matched by the indicated rate of advance of the electrode 175 as indicated by means of the dial indicators 246, which are associated with the long indicator rods 244. As soon as the desired amount of metal has been removed from the surface of work piece 49, as sensed by these work indicators 246, the electric current is shut off, the power to the rotating spindle assembly 33 is cut off, the motor 69 cut off, and the work piece 49 cleaned of remaining electrolyte. In this manner, it is possible to remove metal accurately electrolytically at a rate of 18 cubic inches per hour at a current of 3,000 amps. D.C. Greater rates of metal removal may be accomplished with metal of lesser degrees of hardness.

Referring now to FIGS. 10 and 11, a modified electrode 175a is shown where the locus of the bores 210a in the top portion 204a is a straight line rather than being distributed over an arcuate surface as in the embodiment of FIGS. 8 and 9. Similarly, a second modified electrode 175b is shown in FIGS. 12 and 13, wherein a foraminous screen 288 and a set of flat baffle plates 289, 290 are disposed so as to completely cover the open chamber formed by walls 199, 200, etc. of the electrode embodiment shown in FIGS. 8 and 9. In this manner, variations in the pattern and intensity of the electrolyte flow through the electrode 175 may be obtained for somewhat different metal removal effects, without departing from the general principal of the operation of the apparatus and process of this invention.

Additionally, apparatus may be constructed utilizing the principal of electrolytic metal removal in accordance with the process of this invention for use in the sawing and analogous shaping of metallic work objects as well as in the removal in such manner from rotating objects as hereinabove described. In this respect, reference is made to FIGURE 16, wherein there is shown a portion of a modified conventional hydraulic hacksaw (Marvel No. 18, manufactured by the Armstrong-Blum Manufacturing Co.). The saw consists generally of the conventional base 300 upon which are mounted front and rear columns 301, 302 which columns have sleeved thereon front and rear cylinders 303, 304. Cylinders 303, 304 support the main body of the saw 305 for vertical movement on the columns 301, 302. The conventional working elements of the saw itself are the blade frame 306 and an extension 307 thereof, which is attached to an adjustable cam follower 308 for engagement with a rotatable cam 309, which is in turn eccentrically mounted on pivot 310. Cam 309 is rotated by means of a gear 311, which is in turn actuated by the drive chain 312. Since pivot 310 is supported in a connecting rod 313 which is in turn mounted on a bearing 314, an oscillating motion is given to the blade frame 306 which is imparted to the hacksaw conventionally mounted thereon. In accordance with the modification of the apparatus of this invention, the conventional hacksaw has been removed and an electrode assembly constructed in accordance with the principles of the apparatus of this invention is substituted in its place. This electrode assembly is shown in FIG. 16 as generally consisting of an insulated material backing plate 315 which is of planar configuration, and of sufficient thickness to impart rigidity to the electrode assembly, the ends of the backing plate being secured to the blade frame 306. Mounted in abutting relationship to the backing plate 315 is the electrode 316, which is also secured to the blade frame 306, and which is additionally connected to inlet conduits 317, 318.

The construction of the electrode 316 is shown in greater detail in FIGS. 21, 22 and 23, wherein the electrode is shown as consisting of a hollow generally triangularly shaped central portion 319 which portion has affixed thereto a sole plate 320; portion 319 and portion 320 having formed therein respectively a series of holes 321, 322 which are in complemental alignment with each other. The opposite ends of the central portion 319 terminate in generally cylindrical cross-section portions 323, 324, which portions are affixed in liquid sealing relationship with a pair of threaded fittings 325, 326. Fitting 325 is in turn threaded onto the threaded stud portion 327 of an adjustable elbow block 328. The threaded stud portion 327 has a bore formed therein 329, and block 328 has a bore 330 formed therein so as to intercommunicate with bore 329. The adjustable elbow block 328 is mounted by means of nuts 331 on threaded studs (not shown) formed on the blade frame 306. Similarly, the fitting 326 is threaded onto the stud portion 332 of a corresponding elbow block 333 which is similarly mounted on the blade frame 306. As shown in FIGURES 17, 18, 19 and 20, conducting bars 334, 335 are clamped to the cylindrical portions 323, 324 by means of clamp portions 336, 337 thereof. Conducting bars 334, 335 are provided with terminals 338, to which in turn are connected conductors 339. The conductors 339, are connected through electric lines corresponding to lines 38 shown schematically in FIG. 1 to the negative terminal of a suitable source of direct current as hereinabove described.

As shown in FIGURE 16, a work object 341 is disposed in close proximity to the sole plate 320 of the electrode 316, and held in this relationship by the conventional vise of the hacksaw assembly. The work object is insulated from the hacksaw assembly in a comparable manner as that hereinbefore described and connected to the positive terminal of the direct current power source. Electrolyte is introduced in accordance with the process of this invention through the conduits 317, 318, the bored elbow blocks 328, 333, the cylindrical portions 323, 324, the body portions 319 and is distributed evenly throughout the length of the electrode 316 through the two aligned series of holes 321, 322, thereby being projected along a rectilinear path with respect to the work object. Upon supplying the direct current through conductors 339, and actuating the conventional hacksaw mechanism, oscillation is imparted to the electrode 316 and electrolytic metal removal in accordance with the process of this invention is effected, thereby duplicating a sawing action. Electrolyte is suitably recovered in a manner similar to that indicated schematically in FIG. 1. In this manner, it has been possible to saw a high temperature steel alloy work piece having a six and a half square inch cross-section in thirty minutes, whereas the conventional sawing of a similar work piece requires approximately from four to five hours.

While I have illustrated and described the best form of the embodiments of my invention known to me, it will be apparent to those skilled in the art that changes may be made in the form of the apparatus described without departing from the spirit and scope of this invention, as set forth in the following and that in some cases features of my invention may be used to advantage without a corresponding use of other features.

Having thus described my invention, I claim:

1. An electrode for use in the electrolytic shaping of a conductive metal work piece comprising (1) a hollow elongated body member constructed of electrically conductive material and having a substantially triangular cross-section; (2) a plurality of closely and substantially equidistantly spaced discharge openings formed in that portion of said body member constituting the base wall in said triangular cross-section and extending throughout a major portion of the length thereof; and (3) an inlet opening formed longitudinally of and at each end of said elongated body member.

2. The electrode in accordance with claim 1 wherein the outer surface of said wall having spaced discharge opening formed therein has a troughlike recess formed therein, said discharge openings terminating in the bottom of said trough.

References Cited by the Examiner

UNITED STATES PATENTS

| | | | |
|---|---|---|---|
| 1,416,929 | 5/1922 | Bailey | 204—224 |
| 2,631,058 | 2/1953 | Inghan et al. | 239—366 X |
| 2,741,594 | 4/1956 | Bowersett | 204—212 |
| 2,750,332 | 6/1956 | Miller | 204—224 |
| 2,827,427 | 3/1958 | Barry | 204—143 |
| 3,019,178 | 1/1962 | Williams | 204—284 |
| 3,041,265 | 6/1962 | Williams | 204—284 |

FOREIGN PATENTS

| | | |
|---|---|---|
| 100,258 | 1898 | Germany. |
| 16,475 | 7/1913 | Great Britain. |

JOHN H. MACK, *Primary Examiner.*

JOSEPH REBOLD, *Examiner.*